United States Patent [19]

Shiga et al.

[11] 4,183,824
[45] Jan. 15, 1980

[54] CATALYSTS FOR THE POLYMERIZATION OF OLEFINS

[75] Inventors: Akinobu Shiga; Yoshiharu Fukui, both of Niihama; Kazuhiro Matsumura, Ashiya; Toshio Sasaki; Masahisa Okawa, both of Niihama, all of Japan

[73] Assignee: Sumitomo Chemical Company, Limited, Osaka, Japan

[21] Appl. No.: 885,249

[22] Filed: Mar. 10, 1978

[30] Foreign Application Priority Data

Mar. 10, 1977 [JP] Japan ................................. 52/26729
Apr. 21, 1977 [JP] Japan ................................. 52-46647

[51] Int. Cl.$^2$ ............................................. C08F 4/64
[52] U.S. Cl. ................................ 252/429 B; 526/140; 526/142
[58] Field of Search ................................. 252/429 B

[56] References Cited

U.S. PATENT DOCUMENTS

| | | | |
|---|---|---|---|
| 3,094,568 | 6/1963 | Hay et al. | 252/429 B X |
| 3,108,145 | 10/1963 | Antonsen | 252/429 B X |
| 3,303,175 | 2/1967 | Achon | 252/429 B X |
| 3,494,873 | 2/1970 | Vohwinkel et al. | 252/429 B |
| 3,660,519 | 5/1972 | Arakawa et al. | 252/429 B X |
| 3,758,621 | 9/1973 | Morikawa et al. | 252/429 B X |
| 3,825,524 | 7/1974 | Wada et al. | 252/429 B X |
| 3,850,899 | 11/1974 | Wada et al. | 252/429 B X |
| 3,960,765 | 6/1976 | Shiga et al. | 252/429 B |
| 4,028,481 | 6/1977 | Shiomura et al. | 252/429 B X |
| 4,048,415 | 9/1977 | Matsuzawa et al. | 252/429 B X |

FOREIGN PATENT DOCUMENTS

| | | |
|---|---|---|
| 992946 | 7/1976 | Canada . |
| 48-34281 | 5/1973 | Japan . |
| 48-50182 | 8/1973 | Japan . |
| 49-07074 | 2/1974 | Japan . |
| 49-06828 | 2/1974 | Japan . |
| 49-48637 | 12/1974 | Japan . |
| 49-48638 | 12/1974 | Japan . |
| 51-37176 | 3/1976 | Japan . |
| 1336942 | 11/1973 | United Kingdom . |

*Primary Examiner*—Patrick Garvin
*Attorney, Agent, or Firm*—Sughrue, Rothwell, Mion, Zinn and Macpeak

[57] ABSTRACT

A method for preparing a solid catalyst comprising reacting a titanium trichloride composition with a mixture of (1) an ether compound and carbon atom and represented by the general formula (IV):

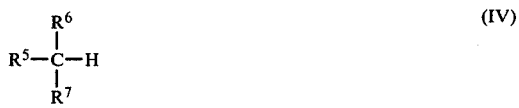

(IV)

wherein $R^5$, $R^6$ and $R^7$, which may be the same or different, each has up to 18 carbon atoms and represents an aliphatic hydrocarbon group, which may be straight chain, branched chain or cyclic, or an aromatic hydrocarbon group, with at least one of $R^5$, $R^6$ and $R^7$ being an aromatic hydrocarbon group, with at least one of $R^5$, $R^6$ and $R^7$ being an aromatic hydrocarbon group, the amount of the hydrocarbon compound being about 0.01 to about 10 moles per mole of titanium trichloride in the titanium trichloride composition; and/or (2) (b) an organic sulfur compound represented by the general formulas (VI) and (VIII):

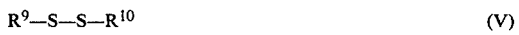

(V)

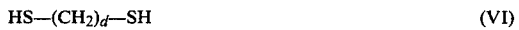

(VI)

wherein each of $R^9$ and $R^{10}$ has up to 18 carbon atoms and represents an aliphatic hydrocarbon group, which may be straight chain, branched chain or cyclic, or an aromatic hydrocarbon group, where $R^9$ and $R^{10}$ may be the same or different; and d is an integer of 2 to 8, the amounts of the organic sulfur compounds represented by the formulas of (VI) and (VII) being about 0.05 to about 1.0 mole and about 0.001 to about 0.2 mole per mole of titanium trichloride in the titanium trichloride composition, respectively.

The catalyst, in combination with organoaluminum compounds as activators, being useful to polymerize olefins for the efficient production of highly crystalline olefin polymers.

34 Claims, 3 Drawing Figures

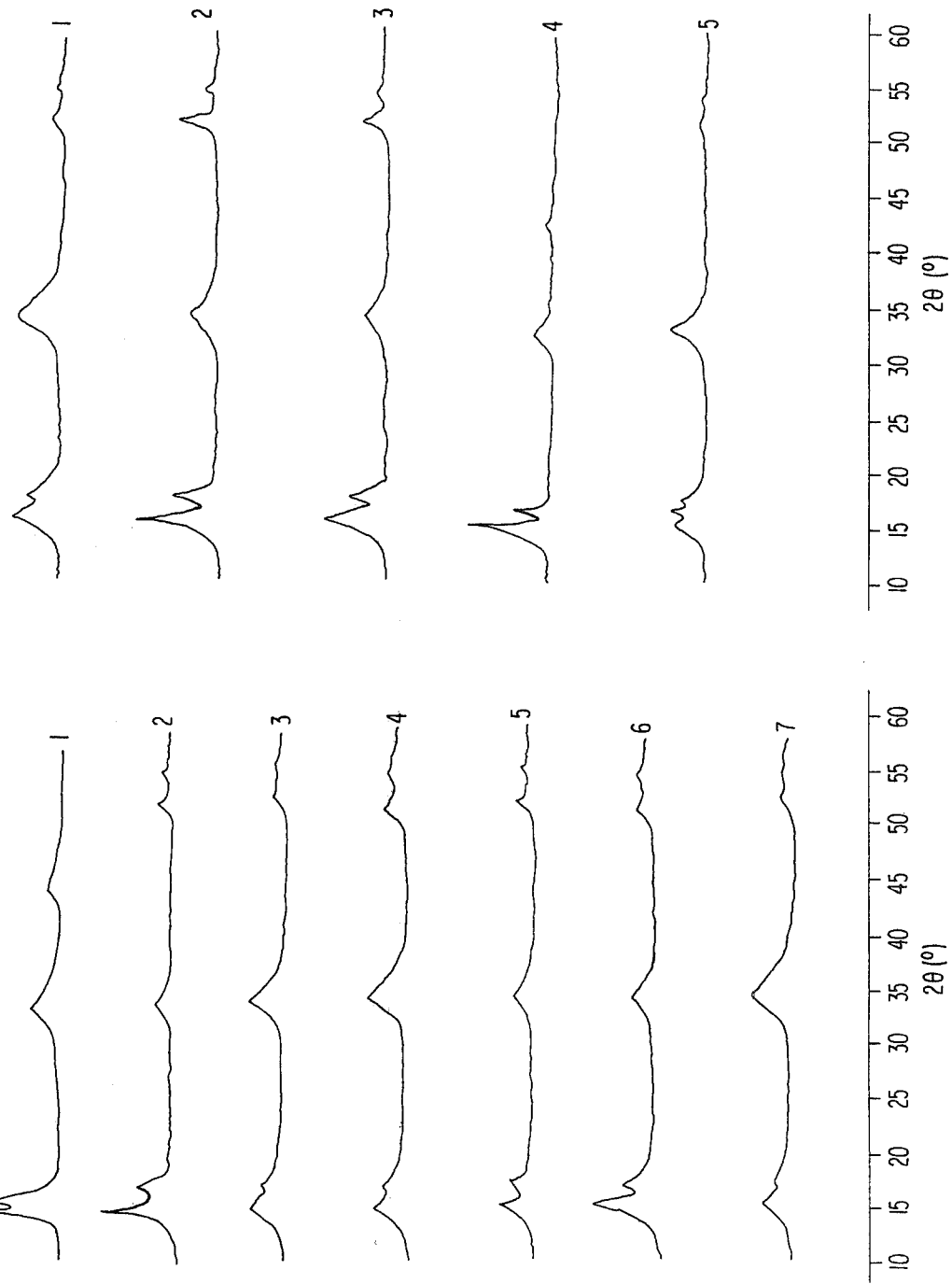

CATALYSTS FOR THE POLYMERIZATION OF OLEFINS

BACKGROUND OF THE INVENTION

1. Field of the Invention

This invention relates to a method for the production of a catalyst useful in the polymerization of olefins and to a method for the production of highly crystalline olefin polymers.

2. Description of the Prior Art

It is well known that olefins can be polymerized using a Ziegler-Natta catalyst comprising a compound of a transition metal of Groups IV to VI of the periodic table and a metal of Groups I to III of the periodic table or an organo-compound of a metal of Groups I to III of the periodic table. Most commonly, the polymerization is performed at less than about 100° C., and the polymers are obtained in a slurry form.

In this polymerization process, amorphous polymers are formed as by-products in addition to olefin polymers of high stereoregularity which are very valuable industrially.

The amorphous polymer has a low industrial value, and adversely affects the mechanical properties of products formed from the olefin polymers such as films and fibers. Moreover, the formation of the amorphous polymer consumes and thereby wastes the monomeric starting material, and an additional means is required to remove the amorphous polymer. This is a very serious industrial disadvantage.

It can be easily imagined therefore that substantial inhibition of the formation of amorphous polymers would be of great industrial advantage.

Furthermore, in this polymerization process, the catalyst remains as a residue in the resulting olefin polymers, and adversely affects the stability and processability of the polymers. Additional equipment is necessary, therefore, to remove the residual catalyst and stabilize the polymers.

These disadvantages of the process can be overcome by increasing the activity of the catalyst which is expressed as the yield of olefin polymer per unit weight of catalyst. If the catalytic activity is increased, no equipment for the removal of the residual catalyst is necessary and the manufacturing cost of the olefin polymer can be reduced.

In the production of olefin polymers such as propylene polymers and butene-1 polymers, titanium trichloride is most widely used as the transition metal compound which is a component of the solid catalyst.

The titanium trichloride used for this purpose is obtained by (1) reducing titanium tetrachloride with hydrogen and activating the reduction product by ball-milling, (2) reducing titanium tetrachloride with metallic aluminum, and activating the reduction product by ball-milling (the resulting compound has the general formula $TiCl_3(AlCl_3)_{\frac{1}{3}}$), or (3) reducing titanium tetrachloride with an organoaluminum compound at about −30° C. to about 10° C. and heating the resulting solid reduction product to about 120° to about 180° C. to change the crystal form of the solid reduction product.

However, the catalytic activity of the titanium trichloride thus-obtained is not entirely satisfactory and the stereoregularity of the polymers produced is also not entirely satisfactory. Thus, various improvements have been attempted.

As improved methods for the preparation of a titanium trichloride composition described above, Japanese Patent Publication Nos. 7074/1974, 48637/1974, 26376/1972, 1947/1974, 6828/1974 and 48638/1974 and Japanese Patent Application (OPI) Nos. 60182/1973 and 37176/1976 disclose methods for preparing the solid catalyst by ball-milling titanium trichloride together with other compounds and then washing the pulverized product with an inert solvent.

All of these improved methods require the pulverization of the titanium trichloride composition in a ball mill, and still the catalysts obtained have insufficient catalytic activity.

Further, Japanese Patent Publication No. 19155/1975 and Japenese Patent Application (OPI) No. 34281/1973 disclose methods for preparing the solid catalyst by washing titanium trichloride with organic ethers, organic thioethers or the like. However, the catalyst obtained has insufficient catalytic activity.

Still further, Japanese Patent Application (OPI) No. 34478/1972, for example, discloses a reduction product having a β-type crystal structure, obtained by reducing titanium tetrachloride with an alkylaluminum and treating with a certain type of complexing agents, particularly, an ether compound, a thioether compound and a thioalcohol represented by the general formulas, $R^0$—O—$R^{00}$, $R^0$—S—$R^{00}$ and $R^0$—S—H, respectively and further with titanium tetrachloride. However, since the catalyst obtained using only a treatment with a complexing agent has catalytic activity as high as that of the above-described reduction product, the method as taught in the above-described Japanese Patent Application (OPI) No. 34478/1972 requires the titanium tetrachloride treatment in order to obtain a catalyst having sufficient properties.

Japanese Patent Application (OPI) No. 74595/1975 discloses that if the reduction product prepared by reducing titanium tetrachloride with an organoaluminum compound is treated with a complexing agent, then is treated with a monoalkyl aluminum dihalide to form a solid catalyst, and if such is subsequently treated further with a complexing agent, a catalyst for the polymerization of highly stereoregular active olefins can be produced.

SUMMARY OF THE INVENTION

As a result of various studies, it has now been found that, during a second treatment of the reduction product, which was previously treated with a complexing agent and with a monoalkyl aluminum dihalide, with an ether compound as a complexing agent, if such is conducted in the presence of a hydrocarbon compound and/or an organic sulfur compound as hereinafter set forth further improvements in the treatment effect are obtained.

More specifically, it has been found that the presence of the hydrocarbon compound and/or organic sulfur compound during the second treatment with a complexing agent employing an ether compound results in a marked increase in the treatment effect, and further that, not only is a markedly improved effect in both catalytic activity and stereoregularity obtained but also this improved effect is observed in the above-described reduction product as well as in a compound of the general formula, $TiCl_3.(AlCl_3)_{\frac{1}{3}}$, obtained by reducing titanium tetrachloride with metallic aluminum and activating by pulverization in a ball mill and in a product obtained by reducing titanium tetrachloride with an organoaluminum compound and heat-treating, and the like.

Still further, it has been surprisingly found that the above-described reaction in which the ether compound is reacted with the hydrocarbon compound and/or organic sulfur compound in combinaton was quite effective for various titanium trichloride compositions with the catalytic activity being markedly improved. Based on these findings, the present invention was made.

An object of this invention is to provide a solid catalyst for the polymerization of olefins which can be used to produce highly crystalline olefin polymers.

Another object of the invention is to provide a method for the production of highly crystalline olefin polymers.

Another characteristic feature of the improvement achieved in the present invention is that the improvement is quite high as compared with the use individually of a hydrocarbon compound or an organic sulfur compound or an ether compound, as demonstrated in the Examples and Comparative Examples given hereinafter. Further, the improvement is observed in the catalyst structure, in particular, the X-ray diffraction peaks.

These and other objects and advantages of the present invention will become apparent from the following summary and subsequent detailed description of the invention.

The present invention is one embodiment thus provides a method for producing a solid catalyst which comprises reacting a titanium trichloride composition represented by the general formula (I):

$$TiCl_3(R_nAlZ_{3-n})_a(E)_b \qquad (I)$$

wherein R has up to 18 carbon atoms and represents an aliphatic hydrocarbon group, which may be straight chain, branched chain or cyclic, or an aromatic hydrocarbon group; Z represents a halogen atom or a hydrogen atom; n is a number defined by the relationship $0 \leq n \leq 3$; a is a number defined by the relationship $0 < a < 1$; E represents an ether compound represented by the general formula (II):

$$R^1-O-R^2 \qquad (II)$$

wherein $R^1$ and $R^2$, which may be the same or different, each represents a straight chain or branched chain alkyl group having 1 to 8 carbon atoms; and b is a number defined by the relationship $0 \leq b < 1$; with a mixture of (1) an ether compound represented by the general formula (III):

$$R^3-O-R^4 \qquad (III)$$

wherein $R^3$ and $R^4$, which may be the same or different, each represents a straight chain or branched chain alkyl group having 1 to 8 carbon atoms; and (2) (a) a hydrocarbon compound containing a tertiary carbon atom and represented by the general formula (IV):

$$\begin{array}{c} R^6 \\ | \\ R^5-C-H \\ | \\ R^7 \end{array} \qquad (IV)$$

wherein $R^5$, $R^6$ and $R^7$, which may be the same or different, each has up to 18 carbon atoms and represents an aliphatic hydrocarbon group, which may be straight chain, branched chain or cyclic, or an aromatic hydrocarbon group, with at least one of $R^5$, $R^6$ and $R^7$ being an aromatic hydrocarbon group; and/or (2) (b) an organic sulfur compound represented by the general formulas (V) to (VII):

$$R^8-SH \qquad (V)$$

$$R^9-S-S-R^{10} \qquad (VI)$$

$$HS-(CH_2)_d-SH \qquad (VII)$$

wherein each of $R^8$, $R^9$ and $R^{10}$ has up to 18 carbon atoms and represents an aliphatic hydrocarbon group, which may be straight chain, branched chain or cyclic, or an aromatic hydrocarbon group, where $R^9$ and $R^{10}$ may be the same or different; and d is an integer of 2 to 8.

In another embodiment of this invention, the invention provides a method for preparing highly crystalline olefin polymers, which comprises polymerizing olefins in the presence of a catalyst system consisting essentially of (A) the solid catalyst obtained by the above-described method and (B) an activator represented by the general formula (VIII):

$$R^{11}{}_eAlY_{3-e} \qquad (VIII)$$

wherein $R^{11}$ represents a straight chain alkyl group or a branched chain alkyl group, each containing 1 to 8 carbon atoms; Y represents a halogen atom, a hydrogen atom, or an alkoxy group; and e is a number of from 2 to 3 (i.e., $2 \leq e \leq 3$).

BRIEF DESCRIPTION OF THE DRAWINGS

FIGS. 1-1, 2, 3, 4, 5, 6 and 7 show X-ray diffraction patterns of the reduction product obtained in Catalyst Preparation Method 1 of Elxample 1, Titanium Trichloride Composition (A) obtained in Catalyst Preparation Method 2 of Example 1, the solid titanium trichloride catalyst obtained in Catalyst Preparation Method 3 of Example 1, the solid titanium trichloride catalyst obtained in Catalyst Preparation Method 3 of Example 2, the catalyst obtained in Comparative Example 6, Titanium Trichloride Composition (C) obtained in Catalyst Preparation Method 1 of Example 3, and the solid titanium trichloride catalyst obtained in Catalyst Preparation Method 2 of Example 3, respectively.

FIGS. 2-1, 2, 3, 4 and 5 show X-ray diffraction patterns of the solid titanium catalyst obtained in Example 9, TiCl₃AA, the catalyst obtained in Comparative Example 9, Titanium Trichloride Composition (D) obtained in Catalyst Preparation Method 1 of Elxample 14 and the solid titanium trichloride catalyst obtained in Catalyst Preparation Method 2 of Example 14.

FIGS. 3-1, 2, 3, 4 and 5 show X-ray diffraction patterns of the catalyst obtained in Comparative Example 12 and Comparative Example 13, Titanium Trichloride Composition (E) obtained in Catalyst Preparation Method 1 of Example 17, the solid titanium trichloride catalyst obtained in Catalyst Preparation Method 2 of Example 2 and the catalyst obtained in Comparative Example 16.

Figure 3:
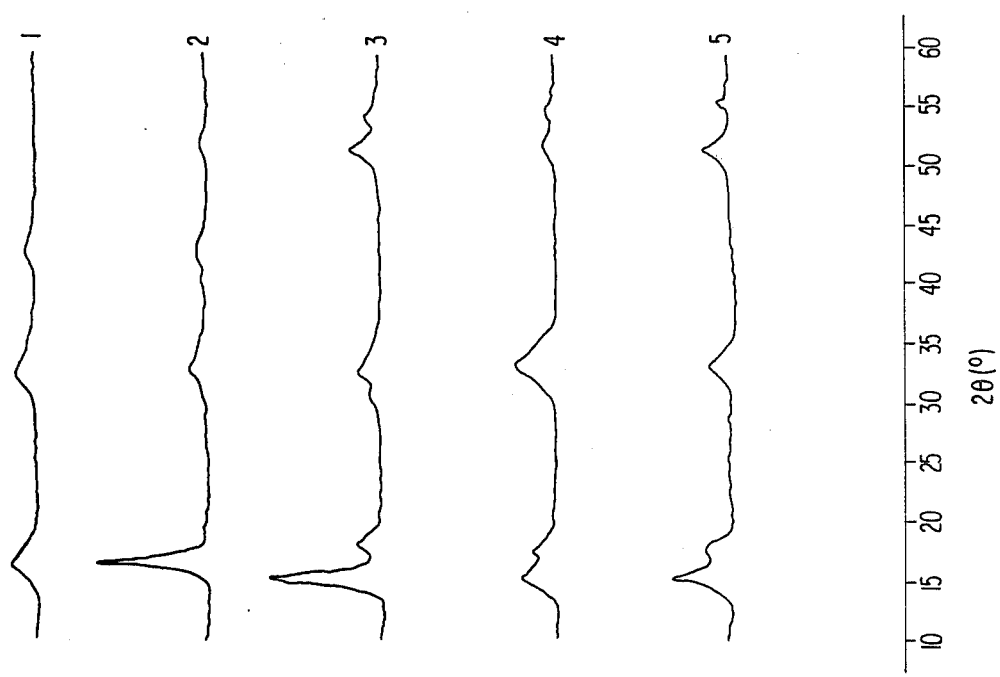

In these Figures, X-ray diffraction patterns were those obtained using CuK α-ray and the abscissas and ordinates show the double (2θ) of the diffraction angle and the diffraction intensity, respectively.

DETAILED DESCRIPTION OF THE INVENTION

As described above, a characteristic feature of the improvement obtained in the present invention using a mixture of an ether compound with a specific hydrocarbon compound and/or an organic sulfur compound is that the improvement is very general, and is observed with various titanium trichloride compositions.

Titanium trichloride compositions obtained by various methods can be used in this invention, but those obtained by the following methods are preferred.

(1) A titanium Trichloride composition represented by the general formula (A):

$$TiCl_3(AlCl_3)_{\frac{1}{3}} \quad (A)$$

which is prepared by reducing titanium tetrachloride with metallic aluminum; and ball-milling the reduction product obtained.

(2) A titanium trichloride composition prepared by reducing titanium tetrachloride with an organoaluminum compound represented by the general formula (B):

$$R'_pAlZ_{3-p} \quad (B)$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3 (i.e., $1 \leq p \leq 3$).

(3) A titanium trichloride composition prepared by reducing titanium tetrachloride with an organoaluminum compound represented by the general formula (B):

$$R'_pAlZ_{3-p} \quad (B)$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3 (i.e., $1 \leq p \leq 3$); spearating the resulting solid product; washing the resulting separated solid product; and heat-treating the resulting washed product at temperatures of about 80° to 180° C.

(4) A titanium trichloride composition prepared by reducing titanium tetrachloride with an organoaluminum compound represented by the general formula (B):

$$R'_pAlZ_{3-p} \quad (B)$$

wherein R' has up to 18 carbon atoms and represents an aliphatic hydrocrbon group, which may be straight chain, branched chain or cyclic, or an aromatic hydrocrbon group, Z represents a halogen atom or a hydrogen atom and p is a number of from 1 to 3 (i.e., $1 \leq p \leq 3$); and treating the reduction product with an aluminum compound represented by the general formula (C):

$$R''_qAlX_{3-q} \quad (C)$$

wherein R" has up to 18 carbon atoms and represents an aliphatic hydrocarbon group, which may be straight chain, branched chain or cyclic, or an aromatic hydrocarbon group, X represents a halogen atom, and q is a number defined by $1 \leq q \leq 1.5$; optionally followed by treating the product with an ether compound.

(5) A titanium trichloride composition prepared by reducing titanium tetrachloride with an organoaluminum compound represented by the general formula (B):

$$R'_pAlZ_{3-p} \quad (B)$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3 (i.e., $1 \leq p \leq 3$); treating the reduction product with an ether compound; and treating the resulting ether-treated solid with an aluminum compound represented by the general formula (C):

$$R''_qAlX_{3-q} \quad (C)$$

wherein R" has up to 18 carbon atoms and represents an aliphatic hydrocarbon group, which may be straight chain, branched chain or cyclic, or an aromatic hydrocarbon group, X represents a halogen atom, and q is a number defined by $1 \leq q \leq 1.5$; optionally followed by treating the product with an ether compound.

(6) A titanium trichloride composition prepared by reducing titanium tetrachloride with an organoaluminum compound represented by the general formula (B):

$$R'_pAlZ_{3-p} \quad (B)$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3 (i.e., $1 \leq p \leq 3$); treating the reduction product with an ether compound; and treating the resulting ether-treated solid with an aluminum compound represented by the general formula (C):

$$R''_qAlX_{3-q} \quad (C)$$

wherein R" has up to 18 carbon atoms and represents an aliphatic hydrocarbon group, which may be straight chain, branched chain or cyclic, or an aromatic hydrocarbon group, X represents a halogen atom, and q is a number defined by $1 \leq q < 1.5$; in the presence of an organic halogen compound represented by the general formula (D):

$$R'''X \quad (D)$$

wherein R''' has up to 18 carbon atoms and represents an aliphatic hydrocarbon group, which may be straight chain, branched chain or cyclic, or an aromatic hydrocarbon group, and X represents a halogen atom; optionally followed by treating the product with an ether compound.

(7) A titanium trichloride composition prepared by reducing titanium tetrachloride with an organoaluminum compound represented by the general formula (B):

$$R'_pAlZ_{3-p} \quad (B)$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3 (i.e., $1 \leq p \leq 3$); treating the reduction product with an ether compound; and treating the resulting ether-treated solid with an aluminum halide represented by the general formula (E):

$$AlX_3 \qquad (E)$$

wherein X represents a halogen atom, dissolved in an aromatic hydrocarbon in the presence of a hydrogen halide represented by the general formula (F):

$$HX \qquad (F)$$

wherein X represents a halogen atom; optionally followed by treating the product with an ether compound.

(8) A titanium trichloride composition prepared by reducing titanium tetrachloride with an organoaluminum compound represented by the general formula (B):

$$R'_pAlZ_{3-p} \qquad (B)$$

wherein R' has up to 18 carbon atoms and represents an aliphatic hydrocarbon group, which may be straight chain, branched chain or cyclic, or an aromatic hydrocarbon group, Z represents a halogen atom or a hydrocarbon atom, and p is a number of from 1 to 3 (i.e., $1 \leq p \leq 3$); treating the reduction product with an ether; and then treating the product with titanium tetrachloride.

The titanium trichloride compositions obtained by the Methods (3) and (4) are especially preferred for use in this invention.

Examples of organoaluminum compounds represented by the general formula (B):

$$R'_pAlZ_{3-p} \qquad (B)$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3 ($1 \leq p \leq 3$), used to reduce titanium tetrachloride in Methods (2), (3), (4), (5), (6), (7) and (8) above include methyl aluminum dichloride, ethyl aluminum dichloride, n-propyl aluminum dichloride, ethyl aluminum sesquichloride, dimethyl aluminum chloride, diethyl aluminum chloride, di-n-propyl aluminum chloride, trimethyl aluminum, triethyl aluminum, triisobutyl aluminum, ethyl dicyclohexyl aluminum, triphenyl aluminum, diethyl aluminum hydride, diisobutyl aluminum hydride, diethyl aluminum bromide and diethyl aluminum iodide.

Of these compounds, diethyl aluminum chloride and ethyl aluminum sesquichloride provide especially preferred results.

The reduction reaction for obtaining the reduction product is carried out at about −60° C. to about 60° C., preferably −30° C. to 30° C. There is no particular restriction on the reaction time, but the reaction time is usually about 1 to about 10 hours. In order to complete the reaction, an after-reaction at an elevated temperature not exceeding about 100° C. is preferably performed. The molar ratio of organoaluminum compound represented by the general formula (B) to the titanium tetrachloride can be appropriately varied depending upon the purposes. When diethyl aluminum chloride or ethyl aluminum sesquichloride is used, preferred results are obtained by using diethyl aluminum chloride in an amount of 0.5 to 1.5 mols per mol of titanium tetrachloride or ethyl aluminum sesquichloride in an amount of 1.5 to 2.5 mols per mol of titanium tetrachloride. Preferably, the reduction reaction is carried out in an inert hydrocarbon solvent such as pentane, hexane, heptane, octane or decane.

The titanium trichloride composition in method (3) described above is prepared by separating the reduction product obtained by the above method, washing the thus separated product and heat-treating the washed product in the absence of or in the presence of an inert hydrocarbon solvent. Heat-treating temperatures can be varied from 50° to 200° C. Specific examples of inert hydrocarbon solvents are hexane, heptane, octane, decane and the like. Usually, the after-treatment at an elevated temperature is at about 80 to about 180° C., preferably, from 100° to 150° C. There is no particular restriction on the after-treatment time, but usually, periods of 30 minutes 5 hours are used conveniently.

The ether compound used to treat the reduction product obtained in Methods (5), (6), (7) and (8) described hereinabove is a compound represented by the general formula (II):

$$R^1-O-R^2 \qquad (II)$$

wherein $R^1$ and $R^2$, which may be the same or different, each represents a straight chain or branched chain alkyl group containing 1 to 8 carbon atoms.

Specific examples of suitable ether compounds represented by the general formula (II) which can be used are diethyl ether, di-n-propyl ether, diisopropyl ether, di-n-butyl ether, diisoamyl ether, di-neopentyl ether, di-n-hexyl ether, methyl n-butyl ether, methyl isoamyl ether, and ethyl isobutyl ether. Of these ether compounds, di-n-butyl ether and diisoamyl ether give especially preferred results.

The treatment of the reduction product with the ether compound is advantageously carried out in the presence of a diluent. Suitable diluents which can be used are inert hydrocarbons such as hexane, heptane; octane, decane, decalin, benzene, toluene and xylene.

The amount of the ether compound used is about 0.05 to about 3.0 mols, preferably 0.5 to 1.5 mols, per mol of titanium trichloride present in the reduction product.

The treatment temperature is desirably about 0° about 100° C. There is no particular limitation on the treatment time, but periods of about 20 minutes to about 5 hours are used conveniently.

The aluminum compounds represented by the general formula (C):

$$R''_qAlX_{3-q} \qquad (C)$$

wherein R'' has up to 18 carbon atoms and represents an aliphatic hydrocarbon group, which may be straight chain, branched chain or cyclic, or an aromatic hydrocarbon group, X represents a halogen atom, and q is a number defined by $1 \leq q < 1.5$, used to treat the reduction product and the ether-treated solid in Methods (4), (5) and (6) above are preferably alkyl aluminum dihalides. Alkyl aluminum dichlorides provide especially preferred results.

Specific examples of aluminum compounds represented by the general formula (C) which can be used include methyl aluminum dichloride, ethyl aluminum dichloride, n-propyl aluminum dichloride, n-butyl aluminum dichloride, n-hexyl aluminum dichloride, n-octyl aluminum dichloride, phenyl aluminum dichloride, o-tolyl aluminum dichloride, cyclohexyl aluminum dichloride, methyl aluminum dibromide, ethyl aluminum dibromide, phenyl aluminum dibromide and methyl aluminum diiodide.

Of these aluminum compounds, ethyl aluminum dichloride provides especially advantageous results.

These aluminum compounds may be used individually or as a mixture of two or more thereof.

The treatment with the aluminum compound may be carried out in the absence of or in the presence of a diluent.

Suitable diluents which can be used are inert hydrocarbons such as hexane, heptane, octane, decane, decalin, benzene, toluene and xylene.

There is no particular restriction on the reaction temperature, but the temperature is usually from room temperature (e.g., about 20°-30° C.) to 200° C., preferably from 50° to 180° C.

The reaction time is also not particularly restricted, but usually, periods of from about 30 minutes to about 5 hours are used conveniently.

When the titanium trichloride composition is to be produced by Method (4) described hereinabove, a method may be employed which comprises reducing titanium tetrachloride with an organoaluminum compound represented by the general formula (B):

$$R'_p AlZ_{3-p} \qquad (B)$$

wherein R', Z and n are as described above, and without washing the reduction product with an inert hydrocarbon solvent, immediately heat-treating the reaction mixture at a temperature of about 50° to about 180° C.

Preferred organic halogen compounds represented by the general formula (D):

$$R'''X \qquad (D)$$

wherein R''' has up to 18 carbon atoms and represents an aliphatic hydrocarbon group, which may be straight chain, branched chain or cyclic, or an aromatic hydrocarbon group, and X represents a halogen atom, used in Method (6) are those in which R''' represents an alkyl or aralkyl group.

Specific examples of organic halogen compounds represented by the general formula (D) which can be used are methyl chloride, ethyl chloride, methyl bromide, ethyl bromide, n-butyl chloride, n-butyl bromide, n-hexyl chloride, n-hexyl bromide, tert-butyl chloride, sec-butyl chloride, chlorocycloheptane, chlorobenzene, bromobenzene, benzyl chloride and benzyl bromide.

Suitable aluminum halides represented by the general formula (E):

$$AlX_3 \qquad (E)$$

wherein X represents a halogen atom, which are used dissolved in an aromatic hydrocarbon in the presence of a hydrogen halide represented by the general formula (F):

$$HX \qquad (F)$$

wherein X represents a halogen atom, to treat the ether-treated solid in Method (7) above include, for example, aluminum chloride, aluminum bromide and aluminum iodide.

Specific examples of the aromatic hydrocarbons which can be used are benzene, toluene, xylene, ethylbenzene, 1,3,5-trimethylbenzene, monochlorobenzene and mixtures of these aromatic hydrocarbons.

In dissolving the aluminum halide represented by the general formula (E), a hydrogen halide represented by the formula (F):

$$HX \qquad (F)$$

wherein X is a halogen atom, such as hydrogen chloride, hydrogen bromide or hydrogen iodide, must also be present. The dissolution of the aluminum halide can be performed at any temperature from room temperature to about 200° C.

The concentration of the aluminum halide suitably ranges from about 1% to about 80% generally because the effect thereof is not sufficient at a concentration of less than about 1% by weight, and concentrations of more than about 80% by weight are commercially disadvantageous.

The treating temperature can be varied from about −100° C. to about 200° C.

The treating time is not particularly restricted, but usually periods of about 5 minutes to about 5 hours are used conveniently.

In each of Methods (4), (5), (6) and (7), described above, the product obtained by treating the reduction product with the aluminum compound, the product obtained by treating the ether-treated solid with the aluminum compound, the product obtained by treating the ether-treated solid with the aluminum compound in the presence of the organic halogen compound, and the product obtained by treating the ether-treated solid with the aluminum halide may be treated further with an ether compound. This ether compound can be selected from those ether compounds represented by the general formula (II) described above used to treat the reduction product.

Advantageously, the optional treatment with the ether compound is carried out in the presence of a diluent. Suitable diluents which can be used are inert hydrocarbon compounds, such as hexane, heptane, octane, decane, decalin, benzene, toluene and xylene.

The amount of the ether compound used is about 0.05 to about 3.0 mols, preferably from 0.5 to 1.5 mols, per mol of titanium trichloride.

The treating temperature is desirably about 0° to about 100° C. There is no particular restriction on the reaction time, but usually periods of about 20 minutes to about 5 hours are conveniently used.

In the preparation of the titanium trichloride composition by Method (8), the final step of treatment with titanium tetrachloride is advantageously carried out in the presence of a diluent. The concentration of the titanium tetrachloride is preferably about 10% by volume to about 70% by volume in general. The treatment temperature ranges from room temperature to about 100° C., preferably from 50° C. to 80° C. A suitable treating time ranges from about 30 minutes to about 4 hours.

According to the method of this invention, the titanium trichloride composition thus obtained is treated with a mixture of (1) an ether represented by the general formula (III):

$$R^3-O-R^4 \qquad (III)$$

wherein $R^3$ and $R^4$, which may be the same or different, each represents a straight chain or branched chain alkyl group having 1 to 8 carbon atoms; and (2)(a) a hydrocarbon compound containing a tertiary carbon atom represented by the general formula (IV):

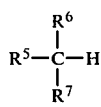
(IV)

wherein $R^5$, $R^6$ and $R^7$, which may be the same or different, each has up to 18 carbon atoms and represents an aliphatic hydrocarbon group, which may be straight chain, branched chain or cyclic, or an aromatic hydrocarbon group, with at least one of $R^5$, $R^6$ and $R^7$ being an aromatic hydrocarbon group; and/or (2)(b) an organic sulfur compound represented by the general formulas (V) to (VII):

$$R^8\text{—SH} \quad (V)$$

$$R^9\text{—S—S—}R^{10} \quad (VI)$$

$$HS\text{—}(CH_2)_d\text{—SH} \quad (VII)$$

wherein each of $R^8$, $R^9$ and $R^{10}$ has up to 18 carbon atoms and represents an aliphatic hydrocarbon group, which may be straight chain, branched chain or cyclic, or an aromatic hydrocarbon group, where $R^9$ and $R^{10}$ may be the same or different, and d is an integer of 2 to 8.

Desirably, the treatment of the titanium trichloride composition with the above-described mixture of (1) and (2) is carried out in a hydrocarbon solvent such as hexane, heptane, octane, decane, benzene, toluene or xylene. The solvent can be selected depending on the reactivity of the hydrocarbon compound (2)(a) of the organic sulfur compound (2)(b) and the treatment conditions used.

The treatment may be carried out using various procedures, for example, (i) a procedure comprising mixing the ether compound (1) with the hydrocarbon compound (2)(a) and/or the organic sulfur compound (2)(b) and then adding the titanium trichloride composition to the mixture, or (ii) a procedure comprising contacting the titanium trichloride composition with the ether compound (1), and then adding the hydrocarbon compound (2)(a) and/or the organic sulfur compound (2)(b). The treatment can also be performed by ball milling. The treatment may be carried out in the presence of a halogenated hydrocarbon compound, a halogen or an interhalogen compound which are disclosed in Japanese Patent Applications (OPI) No. 11079/1977, 33289/1978 and 51285/1978.

The ether compound (1) to be used together with the hydrocarbon and/or organic sulfur compound (2) may be selected from those ether compounds represented by the general formula (II) described above for reaction with the reduction product of titanium tetrachloride. That is to say, the ether compounds are those which are represented by the general formula (III):

$$R^3\text{—O—}R^4 \quad (III)$$

wherein $R^3$ and $R^4$, which may be the same or different, each represents a straight chain or branched chain alkyl group having 1 to 8 carbon atoms.

Specific examples of ether compounds represented by the general formula (III) are diethyl ether, di-n-propyl ether, diisopropyl ether, di-n-butyl ether, diisoamyl ether, di-neo pentyl ether, di-n-hexyl ether, methyl-n-butyl ether, methyl isoamyl ether, ethyl isobutyl ether and the like. Of these ether compounds, di-n-butyl ether and diisoamyl ether give the most preferred results. The amounts of ether compound which can be used is 0.01 to 5 mols, preferably 0.03 to 3.0 mols, per mol of titanium trichloride present in the titanium trichloride composition.

The amount of the hydrocarbon compound (2)(a) or the organic sulfur compound (2)(b) which can be used will vary depending on the properties thereof, the properties of the titanium trichloride composition and the treatment conditions. A suitable amount of the hydrocarbon compound (2)(a) and the organic sulfur compound (2)(b) where a thioalcohol, disulfide and dithiol are used is usually 0.01 to 10 mols, preferably 0.05 to 5 mols, 0.001 to 0.3 mol, preferably 0.01 to 0.2 mol, 0.005 to 1.0 mol, preferably 0.01 to 0.5 mol, and 0.001 to 0.2 mol, preferably 0.01 to 0.15 mol, respectively, per mol of titanium trichloride present in the titanium trichloride composition.

Specific examples of hydrocarbon compound (2)(a) represented by the general formula (IV) described above include cumene, p-cymene, sec-butyl benzene, p-sec-butyltoluene, 2-isopropylnaphthalene, 1-methyltetralin, 6-isopropyltetralin, 1-ethylindane, 9-methylfluorene, triphenylmethane, 1,1,2-triphenylethane, 2,3-diphenylbutane and the like.

Specific examples of organic sulfur compounds (2)(b) represented by the general formulas (V) to (VII) described above include methyl mercaptan, ethyl mercaptan, n-propyl mercaptan, n-butyl mercaptan, isobutyl mercaptan, n-hexyl mercaptan, thiophenol, benzyl mercaptan, dimethyl disulfide, diethyl disulfide, di-n-butyl disulfide, di-n-amyl disulfide, ethyl tert-butyl disulfide, di-sec-butyl disulfide, di-tert-butyl disulfide, di-isobutyl disulfide, di-n-hexyl disulfide, dilauryl disulfide, diphenyl disulfide, di-1-naphthyl disulfide, di-p-tolyl disulfide, dibenzyl disulfide, 1,2-ethane dithiol, trimethylene mercaptan, tetramethylene mercaptan, hexamethylene mercaptan and the like.

The invention, however, should not be interpreted as being limited to these exemplified hydrocarbon compounds (2)(a) and organic sulfur compounds (2)(b).

Of the above hydrocarbon compounds (2)(a) and organic sulfur compounds (2)(b), cumene, triphenylmethane, n-butyl mercaptan, 1,2-ethane dithiol, di-n-butyl disulfide give the most preferred results.

Desirably, the treatment is carried out in the presence of a hydrocarbon solvent such as hexane, heptane, octane, decane, benzene, toluene and xylene. The solvent can be appropriately selected depending on the reactivity of the hydrocarbon compound (2)(a) and/or the organic sulfur compound (2)(b) and the treatment conditions.

The treating time is also not particularly restricted, but usually periods of from about 5 minutes to about 5 hours are conveniently used.

The temperature at which the titanium trichloride composition is treated with the mixture of the ether compound (1) and the hydrocarbon compound and/or the organic sulfur compound (2) can be optionally chosen, but is preferably from about −30° C. to about 200° C., more preferably from 0° C. to 150° C.

The improvement is further increased if the treatment of the titanium trichloride composition with the mixture of the ether compound (1) and the hydrocarbon compound and/or the organic sulfur compound (2) is performed after pulverizing the titanium trichloride composition. The pulverization is carried out in an atmosphere of an inert gas such as nitrogen or argon which is shielded from air and moisture.

The term "treatment" referred to herein means the operation of bringing the solid titanium trichloride into contact with a treating agent to react the solid titanium trichloride therewith, and separating the resulting solid by washing and filtration. Suitable washing media which can be used include inert hydrocarbon solvents, for example, those described above as suitable diluents.

The treating time and the treating temperature referred to herein mean the time and temperature which are required to bring solid titanium trichloride into contact with the treating agent.

The pulverization of the titanium trichloride composition can be performed using various conventional methods, for example, methods using a ball mill, an impact mill, or a vibratory mill.

As described above, in the second embodiment of this invention, (A) the solid titanium chloride catalyst represented by the general formula (I) obtained as described above is used in combination with (B) an activator represented by the general formula (VIII)

$$R^{11}{}_e AlY_{3-e} \qquad \text{(VIII)}$$

wherein $R^{11}$ represents a straight chain or branched chain alkyl group containing 1 to 8 carbon atoms; Y represents a halogen atom or a hydrogen atom or an alkoxy group; and e is a number of from 2 to 3 ($2 \leq e \leq 3$). Suitable examples of activators which can be used for polymerizing olefins include dimethyl aluminum chloride, diethyl aluminum chloride, diisobutyl aluminum chloride, diethyl aluminum bromide, diethyl aluminum iodide, trimethyl aluminum, triethyl aluminum, diethyl aluminum hydride, and diethyl aluminum ethoxide. Of these activators, diethyl aluminum chloride is especially preferred.

The molar ratio of the titanium trichloride solid catalyst (calculated as titanium trichloride present in the solid) (A) to the activator (B) ranges from about 10:1 to about 1:500, preferably 2:1 to 1:200.

In the polymerization, a Lewis base which has been used to improve the stereoregularity of the resulting olefin polymers obtained may be used as a third component (C) in addition to the combination of the solid titanium trichloride catalyst (A) and the activator (B).

The polymerization can be performed at a temperature of from about −30° C. to about 200° C. Usually, however, temperatures of 0° to 100° C. are preferred because at a temperature lower than 0° C., the rate of polymerization tends to decrease, and at a temperature above 100° C., highly stereoregular polymers are not obtained.

There is no particular restriction on the polymerization pressure, but for commercial and economic reasons, pressures of about 3 to about 100 atmosphere are desirable.

The polymerization can be performed either in a continuous manner or in a batchwise manner.

The olefins to which the present invention is applicable are those containing 2 to 10 carbon atoms, for example, ethylene, propylene, butene-1, pentene-1 and 4-methylpentene-1. The invention, however, should not be interpreted as being limited to these exemplified compounds.

The olefin polymerization can be either a homopolymerization or a copolymerization.

In copolymerization, two or more olefins are mixed and contacted with the catalyst system to form copolymers. In order to obtain highly stereoregular copolymers, the mixing ratio of the two olefins is desirably such that proportion of one of the olefins is not more than about 10 mol%.

Copolymerization in two or more stages to produce heteroblock copolymers can also be easily performed.

Suitable methods of polymerization include slurry polymerization in which an inert hydrocarbon solvent such as butane, pentane, hexane, heptane or octane is used, or the polymerization can be performed in liquid olefin monomer or gaseous olefin monomer without using a solvent.

The following Examples and Comparative Examples are given to further illustrate the present invention. It should be noted, however, that the invention is in no way to be construed as being limited to these Examples. In these Examples, the molar ratio of the reduction product of titanium tetrachloride or the titanium trichloride composition to the treating agent is calculated on the basis of the titanium trichloride present in the reduction product or the titanium trichloride composition.

Example 1

(a) Catalyst Preparation Method 1

(preparation of the reduction product):

A 1-liter reactor was purged with argon, and then charged with 200 cc of dry hexane and 50 cc of titanium tetrachloride. The solution was maintained at −5° C.

Then a solution of 150 cc of dry hexane and 58 cc of diethyl aluminum chloride was added dropwise thereto so that the temperature of the reaction system was maintained at −3° C.

After the addition, the solution was stirred for an additional 30 minutes. The temperature was increased to 70° C., and the stirring was continued further for 1 hour.

The resulting product was allowed to stand, and the reduction product was separated using a solid-liquid separating technique. The solid was washed with 200 cc of hexane to obtain 74.0 g of the reduction product which contained 4.60% by weight of Al. As shown in FIG. 1-1, the reduction product thus-obtained showed X-ray diffraction peaks at $2\theta = 16.4°$ and $32.5°$ inherent to β-type titanium trichloride defined by G. Natta, J. Polymer Science, Vol. 51, pgs. 399–410 (1961), but did not show an X-ray diffraction peak at $2\theta = 33.7°$ inherent to δ-type titanium trichloride.

(b) Catalyst Preparation Method 2

[preparation of Titanium Trichloride Composition (A)]:

35.7 g of the reduction product obtained in Catalyst Preparation Method 1 of Example 1 was added to a solution of 107 cc of n-decane and 71 cc of ethyl aluminum dichloride, and reacted at 125° C. for 2 hours.

After the reaction, the supernatant liquid was removed, and the residue was washed three times with 100 cc of hexane, dried and divided into small portions for use in polymerization.

The resulting titanium trichloride composition is designated Titanium Trichloride Composition (A). The Titanium Trichloride Composition (A) showed X-ray diffraction peaks at $2\theta = 15.1°$, $17.2°$, $33.0°$, $51.8°$ and 54.1°, as shown in FIGS. 1-2, instead of peaks ($2\theta = 16.4$ and 32.5°) inherent to β-type titanium trichloride.

(c) Catalyst Preparation Method 3

[reaction of Titanium Trichloride Composition (A)]:

Titanium Trichloride Composition (A) (15.09 g) obtained in Catalyst Preparation Method 1 of Example 1 was suspended in 75.0 cc of benzene, and cumene and di-n-butyl ether were added in such amounts that the molar ratio of the TiCl$_3$ Composition (A): cumene: di-n-butyl ether was 1:0.50:1.0. The mixture was reacted at 100° C. for 1 hour to obtain a solid titanium trichloride catalyst.

After the reaction, the supernatant liquid was removed, and the residue was washed three times with 100 cc of hexane, dried and divided into small portions for use in polymerization.

As shown in FIGS. 1-3, the X-ray diffraction peak at $2\theta = 15°$ of the resulting solid titanium trichloride catalyst had a greater degree of halo than Titanium Trichloride Composition (A) and the X-ray diffraction peak at $2\theta = 33°$ was higher than that of Titanium Trichloride Composition (A).

The specific surface area ($S_w$) of the solid titanium trichloride catalyst, measured using a flow method with gas chromatography, was 0.5 m$^2$/g and the solid catalyst contained 1.06% by weight of Al.

Polymerization of Propylene (a) Polymerization Method 1:

A 5-liter stainless steel autoclave with a stirrer was purged with nitrogen, and then charged with 1.5 liters of dry heptane, 3.0 g of diethyl aluminum chloride and 120 mg of the solid titanium trichloride catalyst obtained in Catalyst Preparation Method 3 above, and hydrogen in an amount corresponding to a partial pressure of 0.16 kg/cm$^2$ was added.

The temperature of the autoclave was increased to 70° C., and propylene was introduced to a pressure of 6 kg/cm$^2$ to start the polymerization. While supplying fresh propylene so as to maintain this pressure of 6 kg/cm$^2$, the polymerization was continued for 4 hours.

After the polymerization, the introduction of propylene was stopped, and the unreacted propylene was purged. 100 cc of butanol was added to decompose the catalyst.

The resulting polymer was filtered with a Buchner filter, washed three times with 500 cc of heptane, and dried at 60° C. to obtain 312 g of polypropylene.

Heptane was removed from the filtrate by steam distillation, and 10 g of an amorphous polymer was obtained.

The proportion of the heptane-insoluble portion (%, to be referred to hereinafter as HIP) in the total polymer obtained was 97.0%, and the boiling heptane-insoluble portion (to be referred to hereinafter as II) of the HIP portion was 97.3%.

The value IY=(HIP/100)×(II/100)×100 was 94.4

The R$_p$ (g polypropylene/g TiCl$_3$.hr) expressing the amount of the polymer produced per gram of TiCl$_3$ solid catalyst per hour was 670.

The polymer had an intrinsic viscosity (to be referred to hereinafter as [η]), measured at 135° C. in tetralin, of 1.92.

(b) Polymerization Method 2:

A 5-liter stainless steel autoclave with a stirrer was purged with nitrogen, and then charged with 3.0 g of diethyl aluminum chloride, and 65 mg of the solid titanium trichloride catalyst obtained in Catalyst Preparation Method 3 above, and hydrogen was added in an amount corresponding to a partial pressure of 0.53 kg/cm$^2$.

Then, 1.4 kg of liquid propylene was introduced under pressure into the autoclave, and polymerized for 4 hours while maintaining the temperature of the autoclave at 70° C.

After the polymerization, the unreacted propylene was purged, and 100 cc of methanol was added to decompose the catalyst.

The polymer obtained was separated by filtration on a Buchner filter, and dried at 60° C. under pressure. Thus, 541 g of polypropylene was obtained.

The R$_p$ and IY, expressing the polymerization activity of the solid titanium trichloride catalyst, were 2080 and 94.5, respectively.

Comparative Example 1

Propylene was polymerized in accordance with Polymerization Method 2 of Example 1 using Titanium Trichloride Composition (A) and 3.0 g of diethyl aluminum chloride as a polymerization catalyst.

The R$_p$ and IY, expressing the polymerization activity of the solid titaniun trichloride composition, were 970 and 91.8, respectively.

Comparative Example 2

Titanium Trichloride Composition (A) was reacted in the same manner as in Example 1 except that di-n-butyl ether was not used.

Using the resulting catalyst, propylene was polymerized in accordance with Polymerization Method 2 of Example 1.

R$_p$=950; IY=92.0

Comparative Example 3

Titanium Trichloride Composition (A) was reacted in the same manner as in Catalyst Preparation Method 3 of Example 1 except that cumene was not used. Using the resulting catalyst, propylene was polymerized in accordance with Polymerization Method 2 of Example 1.

R$_p$=1,120; IY=91.0.

EXAMPLE 2

(a) Catalyst Preparation Method 1

(preparation of ether-reacted solid)

21.2 g of the reduction product obtained in Catalyst Preparation Method 1 for Example 1 was suspended in 106 cc of dry hexane, and diisoamyl ether was added in an amount such that the molar ratio of titanium chloride in the reduction product: diisoamyl ether was 1:1.2. The mixture was stirred at 40° C. for 1 hour. After the reaction, the supernatant liquid was removed, and the residue was washed three times with 100 cc of hexane, and dried.

(b) Catalyst Preparation Method 2

(ethyl aluminum dichloride treatment of ether-treated solid)

12.5 g of the ether-reacted solid obtained in Catalyst Preparation Method 1 of Example 2 was added to a solution of 37.5 cc of n-decane and 25 cc of ethyl aluminum dichloride, and reacted at 125° C. for 2 hours.

After the reaction, the supernatant liquid was removed and the residue was washed three times with 30 cc of hexane and dried. The titanium trichloride composition contained 4.18% by weight of Al. The resulting titanium trichloride composition is designated Titanium Trichloride Composition (B).

Titanium Trichloride Composition (B) showed X-ray diffraction peaks at $2\theta = 15.1°$, $17.2°$, $33.0°$, $51.8°$ and $54.1°$ instead of the X-ray diffraction peaks at $2\theta = 16.4°$ and $32.5°$ inherent to β-type titanium trichloride.

(c) Catalyst Preparation Method 3

Titanium Trichloride Composition (B) (10.0 g) was suspended in 50.0 cc of toluene, and cumene and di-n-butyl ether were added in amounts such that the molar ratio of Titanium Trichloride Composition (B): cumene: di-n-butyl ether was 1:0.30:1.0. The mixture was reacted at 100° C. for 1 hour. After the reaction, the supernatant was removed, the residue was washed twice with 30 cc of toluene and twice with 30 cc of hexane, dried and divided into small portions for use in polymerization. As shown in FIGS. 1-4, the X-ray diffraction peak at $2\theta = 15.1°$ of the resulting solid titanium trichloride catalyst had a halo and the X-ray diffraction peak at $2\theta = 33°$ of the resulting catalyst was greater than that of Titanium Trichloride Composition (B).

Polymerization of Propylene

Propylene was polymerized in accordance with Polymerization Method 2 of Example 1 using the titanium trichloride solid catalyst obtained in Catalyst Preparation Method 3 of Example 2.

The $R_p$ IY were 2,010 and 94.9, respectively, and the polymer obtained had an $[\eta]$ of 2.09.

Comparative Example 4

Propylene was polymerized in accordance with Polymerization Method 2 of Example 1 using Titanium Trichloride Composition (B) prepared in accordance with Catalyst Preparation Method 2 of Example 2 as a polymerization catalyst.

The $R_p$ and IY were 1,050 and 92.0, respectively.

Comparative Example 5

A solid titanium trichloride catalyst was prepared in the same manner as in Catalyst Preparation Method 3 of Example 2 except that di-n-butyl ether was not used.

Propylene was polymerized in accordance with Polymerization Method 2 of Example 1 using the resulting catalyst.

$R_p = 960$; IY = 92.0.

Comparative Example 6

A solid titanium trichloride catalyst was prepared in the same manner as in Catalyst Preparation Method 3 of Example 2 except that cumene was not used.

Propylene was polymerized in accordance with Polymerization Method 2 of Example 1 using the resulting catalyst.

$R_p = 1,430$; IY = 91.4.

As shown in FIGS. 1-5, the X-ray diffraction peaks at $2\theta = 15.0°$ and $33.0°$ of the catalyst were sharper and smaller, respectively, in comparison with those of the titanium trichloride catalyst prepared in accordance with Catalyst Preparation Method 3 of Example 2.

It appears, from a comparison of the results of Example 2 with those of this Comparative Example, that the effect obtained by the present invention is different from that obtained by reaction using only the ether compound.

EXAMPLE 3

(a) Catalyst Preparation Method 1

(preparation of reduction product of titanium tetrachloride):

A 1-liter reactor was purged with argon, and then charged with 200 cc of dry hexane and 50 cc of titanium tetrachloride. The solution was maintained at $-5°$ C.

Then, a solution of 150 cc of dry hexane and 116 cc of ethyl aluminum sesquichloride was added dropwise thereto, under conditions such that the temperature of the reaction system was maintained at $-3°$ C.

The mixture was stirred at this temperature for 2 hours, the temperature was increased to 100° C., and the stirring was continued for 2 hours.

After the reaction, the reaction mixture was allowed to stand, and the reduction product obtained was separated using a solid-liquid separation. The separated solid product was washed four times with 200 cc of hexane.

As shown in FIGS. 1-6, the resulting Titanium Trichloride Composition (C) showed X-ray diffraction peaks at 15.1°, 17.2°, 33.0°, 51.8° and 54.1° ($2\theta$).

(b) Catalyst Preparation Method 2

Titanium Trichloride Composition (C) was reacted in accordance with Catalyst Preparation Method 2 of Example 1. As shown in FIGS. 1-7, the X-ray diffraction peaks of the resulting titanium trichloride solid catalyst haloed at 15.1° ($2\theta$) and was higher at 33.8° ($2\theta$). The catalyst contained 0.88% by weight of Al.

Polymerization of Propylene

Propylene was polymerized in accordance with Polymerization Method 2 of Example 1 using the solid titanium trichloride catalyst prepared according to Catalyst Preparation Method 2 of Example 3. The $R_p$ and IY were 2,250 and 96.0, respectively.

EXAMPLES 4 to 8

Solid titanium trichloride catalysts were prepared in the same manner as in Example 3 except that the reaction conditions for Titanium Trichloride Composition (C) were changed as shown in Table 1 below. The results obtained are also shown in Table 1 below.

Table 1

| Example No. | Hydrocarbon Compound/ Organic Sulfur Compound (A) | Ether Compound (B) | Solvent | Reaction Temperature (°C.) | TiCl$_3$:(A):(B) (molar ratio) | Polymerization Results | |
|---|---|---|---|---|---|---|---|
| | | | | | | $R_p$ | IY |
| 4 | Cumene | Di-n-butyl Ether | Toluene | 60 | 1 : 0.5 : 1.0 | 1680 | 93.6 |
| 5 | Cumene | Di-n-butyl Ether | Hexane | 100 | 1 : 0.5 : 1.0 | 1840 | 93.7 |
| 6 | Triphenyl-methane | Diisoamyl Ether | Toluene | 60 | 1 : 0.3 : 1.0 | 2100 | 94.4 |

Table 1-continued

| Example No. | Hydrocarbon Compound/ Organic Sulfur Compound (A) | Ether Compound (B) | Solvent | Reaction Temperature (°C.) | TiCl$_3$:(A):(B) (molar ratio) | Polymerization Results R$_p$ | IY |
|---|---|---|---|---|---|---|---|
| 7 | n-Butyl Mercaptan | Di-n-butyl Ether | Toluene | 100 | 1 : 0.1 : 1.0 | 1580 | 93.0 |
| 8 | Di-n-butyl Disulfide | Di-n-butyl Ether | Toluene | 100 | 1 : 0.2 : 1.0 | 2200 | 94.6 |

Reaction Time: 1 hour

EXAMPLE 9

TiCl$_3$AA (a product of Toho Titanium Co., Ltd.; 36.0 g) was suspended in 180 cc of toluene, and 0.20 mol and 1.0 mol, respectively, per mol of TiCl$_3$AA, of cumene and di-n-butyl ether was added. The mixture was reacted at 100° C. for 1 hour.

After the treatment, the supernatant liquid was removed and the residue was washed twice with 100 cc of toluene and twice with 100 cc of heptane, dried and divided into small portions for use in polymerization.

The resulting catalyst is designated a solid titanium trichloride catalyst.

As shown in FIG. 2-1, the X-ray diffraction patterns of the titanium trichloride solid catalyst showed a broader peak at 15.1° (2θ) and a greater peak in intensity at 33.0° (2θ) comparison with those of the TiCl$_3$AA before the reaction.

Polymerization of Propylene

Propylene was polymerized in accordance with Polymerization Method 2 of Example 1 using the solid titanium trichloride catalyst obtained in Example 9.

The R$_p$, expressing the polymerization activity of the titanium trichloride solid catalyst, was 1,230, and the IY was 94.4.

The R$_p$ and IY were 703 and 91.8, respectively.

Comparative Example 9

A catalyst was prepared in the same manner as in Example 9, except that cumene was not used. Propylene was polymerized in the same manner as in Polymerization Method 2 of Example 1 using the resulting catalyst.

The R$_p$ and IY were 820 and 92.0, respectively. As shown in FIG. 2-3, the X-ray diffraction pattern of the catalyst showed a sharper peak at 15.1° (2θ) and a smaller peak in intensity at 33.0° (2θ) in comparison with the solid titanium trichloride catalyst obtained in Example 9.

From a comparison of the results obtained in Example 9 with those of Comparative Examples 7 to 9, it can be seen that good results are obtained in the present invention.

EXAMPLES 10 to 13

Solid titanium trichloride catalysts were prepared in the same manner as in Example 9 except that the reaction conditions for TiCl$_3$AA were changed as shown in Table 2 below. Using each of the resulting catalysts, propylene was polymerized in accordance with Polymerization Method 2 of Example 1. The results obtained are also shown in Table 2 below.

Table 2

| Example No. | Hydrocarbon Compound/ Organic Sulfur Compound(A) | Ether Compound (B) | Solvent | Reaction Temperature (°C.) | TiCl$_3$:(A):(B) (molar ratio) | Polymerization Results R$_p$ | IY |
|---|---|---|---|---|---|---|---|
| 10 | Cumene | Di-n-butyl Ether | Toluene | 60 | 1 : 1.0 : 0.7 | 1130 | 94.0 |
| 11 | Triphenyl-methane | Diisoamyl Ether | Toluene | 100 | 1 : 0.2 : 1.0 | 1200 | 93.8 |
| 12 | n-Butyl Mercaptan | Di-n-butyl Ether | Toluene | 100 | 1 : 0.1 : 1.0 | 970 | 93.5 |
| 13 | Di-n-butyl Disulfide | Di-n-butyl Ether | Toluene | 100 | 1 : 0.2 : 1.0 | 1280 | 94.3 |

Comparative Example 7

Propylene was polymerized in accordance with Polymerization Method 2 of Example 1 except using TiCl$_3$AA used as a starting material in Example 9 as a polymerization catalyst.

The R$_p$ and IY were 750 and 91.5, respectively. The X-ray diffraction pattern of TiCl$_3$AA is shown in FIG. 2-2.

Comparative Example 8

A catalyst was prepared in the same manner as in Example 9 except that di-n-butyl ether was not used. Propylene was polymerized in the same manner as in Polymerization Method 2 of Example 1 using the resulting catalyst.

EXAMPLE 14

(a) Catalyst Preparation Method 1:

A 1-liter reactor was purged with argon, and then charged with 200 cc of dry hexane and 50 cc of titanium tetrachloride. The solution was maintained at −5° C.

Then, a solution of 150 cc of dry hexane and 116 cc of ethyl aluminum sesquichloride was added dropwise thereto, under conditions such that the temperature of the reaction system was maintained at −3° C.

The mixture was stirred at this temperature for 2 hours, the temperature was increased to 10° C., and the stirring was continued for 2 hours.

The resulting titanium trichloride composition is designated Titanium Trichloride Composition (D).

After the reaction, the reaction mixture was allowed to stand, and the Titanium Trichloride Composition (D) was separated using a solid-liquid separation. The separated solid product was washed five times with 200 cc of hexane.

The Titanium Trichloride Composition (D) contained 5.32% by weight of Al.

As shown in FIG. 2-4, the X-ray diffraction pattern thereof showed peaks at $2\theta = 16.4°$ and 32.5° inherent to β-type titanium trichloride.

(b) Catalyst Preparation Method 2:

Titanium Trichloride Composition (D) (12.3 g) obtained in Catalyst Preparation Method 1 of Example 14 was suspended in 61.5 cc of toluene, and 0.20 mol and 1.0 mol, respectively, per mol of Titanium Trichloride Composition (D), of cumene and di-n-butyl ether were added. The mixture was reacted at 100° C. for 1 hour.

After the treatment, the supernatant liquid was removed, and the residue was washed twice with 30 cc of toluene and twice with 30 cc of hexane, dried and divided into small portions. The resulting solid titanium trichloride catalyst contained 0.35% by weight of Al, and X-ray diffraction peaks at $2\theta = 15.1°$, 16.4°, 33.0°, 51.4° and 54.1° in the X-ray diffraction pattern thereof were exhibited, as shown in FIG. 2-5. The peak at $2\theta = 33.0°$ of the resulting solid titanium trichloride was greater in intensity than that of Titanium Trichloride Composition (D) obtained in Catalyst Preparation Method 1 of Example 14.

Polymerization of Propylene

Using the solid titanium trichloride catalyst obtained in Catalyst Preparation Method 2 of Example 14, propylene was polymerized in accordance with Polymerization Method 2 of Example 1.
$R_p = 1,250$; IY = 94.0.

Comparative Example 10

Propylene was polymerized in accordance with Polymerization Method 2 of Example 1, using Titanium Trichloride Composition (D) as a catalyst.
$R_p = 682$; IY = 80.2.

Comparative Example 11

The solid catalyst was prepared in the same manner as in Catalyst Preparation Method 2 of Example 14 except that di-n-butyl ether was not used.

Propylene was polymerized in accordance with Polymerization method 2 of Example 1 using the resulting catalyst.
$R_p = 700$; IY = 82.0.

Comparative Example 12

The solid catalyst was prepared in the same manner as in Catalyst Preparation Method 2 of Example 14 except that cumene was not used.

The X-ray diffraction pattern is shown in FIG. 3-1.

Propylene was polymerized in accordance with Polymerization Method 2 of Example 1.
$R_p = 850$; IY = 88.0.

Comparative Example 13

The catalyst was prepared in the same manner as in Comparative Example 12, except that the reaction temperature was changed to 35° C.

As shown in FIG. 3-2, the X-ray diffraction pattern of the resulting catalyst showed peaks at $2\theta = 16.4°$ and 42.3° inherent to Γ-type titanium trichloride, and the peak at $2\theta = 33.0°$ in the X-ray diffraction pattern of the resulting catalyst was smaller than that of the titanium trichloride solid catalyst obtained in Catalyst Preparation Method 2 of Example 14.

Propylene was polymerized in accordance with Polymerization Method 2 of Example 1, using the resulting catalyst.
$R_p = 730$; IY = 81.0.

From a comparison of the results obtained in Example 14 with those of Comparative Examples 10, 11, 12 and 13, it can be seen that the results in the present invention are superior and different from those obtained by treatment with only an ether compound.

EXAMPLES 15 and 16

A titanium trichloride solid catalyst was prepared under the reaction conditions as shown in Table 3 below.

Using each of the resulting catalysts, propylene was polymerized in accordance with Polymerization Method 2 of Example 1. The results obtained are also shown in Table 3 below.

EXAMPLE 17

Catalyst Preparation Method 1:

Titanium Trichloride Composition (D) (32.0 g), prepared in accordance with Catalyst Preparation Method 1 of Example 14, was suspended in 160.0 cc of n-decane and heat-treated at 110° C. for 2 hours.

After the heat-treatment, the supernatant liquid was removed, and the residue was washed three times with 100 cc of haptane, dried and divided into small portions. The resulting titanium trichloride composition was designated Titanium Trichloride Composition (E). Titanium Trichloride Composition (E) contained 5.11% by weight of Al.

The X-ray diffraction pattern of Titanium Trichloride Composition (E) is shown in FIG. 3-3.

Table 3

| Example No. | Hydrocarbon Compound/ Organic Sulfur Compound(A) | Ether Compound (B) | Solvent | reaction Temperature (°C.) | TiCl$_3$:(A):(B) (molar ratio) | Polymerization Results | |
|---|---|---|---|---|---|---|---|
| | | | | | | $R_p$ | IY |
| 15 | Cumene | Di-n-butyl Ether | Toluene | 100 | 1 : 0.2 : 1.0 | 1050 | 94.5 |
| 16 | Di-n-butyl Disulfide | Di-n-butyl Ether | Toluene | 100 | 1 : 0.09 : 1.0 | 1310 | 94.8 |

Catalyst Preparation Method 2:

Titanium Trichloride Composition (E) (13.3 g), prepared in Catalyst Preparation Method 1 of Example 17, was suspended in 56.5 cc of toluene, and di-n-butyl disulfide and di-n-butyl ether were added in amounts such that the molar ratio of the Titanium Trichloride Composition (E): di-n-butyl disulfide: di-n-butyl ether was 1:0.20:1.0. The mixture was reacted at 100° C. for 1 hour.

After the reaction, the supernatant liquid was removed and the residue was washed twice with 40 cc of toluene and three times with 40 cc of heptane, dried and divided into small portions for polymerization. The resulting titanium trichloride catalyst contained 0.64% by weight of Al.

As shown in FIG. 3-4, the X-ray diffraction peak at $2\theta=15.1°$ in the X-ray diffraction pattern of the solid titanium trichloride catalyst exhibited a greater degree of halo than that of Titanium Trichloride Composition (E) and the X-ray diffraction peak at $2\theta=33.0°$ was greater than that of Titanium Trichloride Composition (E).

Polymerization of Propylene

Propylene was polymerized in accordance with Polymerization Method 2 of Example 1, using the solid titanium trichloride catalyst obtained in Catalyst Preparation Method 2 of Example 17.
$R_p=2,100$; IY=96.0.

Comparative Example 14

Propylene was polymerized in accordance with Polymerization Method 2 of Example 1, using Titanium Trichloride Composition (E) obtained in Catalyst Preparation Method 1 of Example 17 as a catalyst.
$R_p=780$; IY=91.0.

Comparative Example 15

A solid catalyst was prepared in the same manner as in Catalyst Preparation Method 2 of Example 17, except that di-n-butyl ether was not used.

Propylene was polymerized in accordance with Polymerization Method 2 of Example 1 using the resulting solid catalyst.
$R_p=730$; IY=91.5.

Comparative Example 16

A solid catalyst was prepared in the same manner as in Catalyst Preparation Method 2 of Example 17, except that di-n-butyl disulfide was not used.

The X-ray diffraction pattern of the resulting catalyst is shown in FIG. 3-5.

Propylene was polymerized in accordance with Polymerization Method 2 of Example 1, using the resulting catalyst.
$R_p=850$; IY=91.3.

While the invention has been described in detail and with reference to specific embodiments thereof, it will be apparent to one skilled in the art that various changes and modifications can be made therein without departing from the spirit and scope thereof.

What is claimed is:

1. A method for producing a solid titanium trichloride catalyst, which comprises reacting a titanium trichloride composition represented by the general formula (I):

$$TiCl_3(R_nAlZ_{3-n})_a(E)_b \quad (I)$$

wherein R has up to 18 carbon atoms and represents an aliphatic hydrocarbon group, which may be straight chain, branched chain or cyclic, or an aromatic hydrocarbon group; Z represents a halogen atom or a hydrogen atom; n is a number defined by the relationship $0 \leq n \leq 3$; a is a number defined by the relationship $0 < a < 1$; E represents an ether compound represented by the general formula (II):

$$R^1-O-R^2 \quad (II)$$

wherein $R^1$ and $R^2$, which may be the same or different, each represents a straight chain or branched chain alkyl group having 1 to 8 carbon atoms; and b is a number defined by the relationship $0 \leq b < 1$; in the presence of a hydrocarbon solvent selected from the group consisting of hexane, heptane, octane, decane, benzene, toluene and zylene at a temperature of $-30°$ to 200° C. for 5 minutes to 5 hours with a mixture of (1) an ether represented by the general formula (III):

$$R^3-O-R^4 \quad (III)$$

wherein $R^3$ and $R^4$, which may be the same or different, each represents a straight chain or branched chain alkyl group having 1 to 8 carbon atoms, the amount of the ether compound being about 0.01 to 5.0 moles per mole of titanium trichloride in the titanium trichloride composition; and (2) (a) a hydrocarbon compound containing a tertiary carbon atom and represented by the general formula (IV):

$$\begin{array}{c} R^6 \\ | \\ R^5-C-H \\ | \\ R^7 \end{array} \quad (IV)$$

wherein $R^5$, $R^6$, and $R^7$, which may be the same or different, each has up to 18 carbon atoms and represents an aliphatic hydrocarbon group, which may be straight chain, branched chain or cyclic, or an aromatic hydrocarbon group, with at least one of $R^5$, $R^6$ and $R^7$ being an aromatic hydrocarbon group, the amount of the hydrocarbon compound being about 0.01 to about 10 moles per mole of titanium trichloride in the titanium trichloride composition; and/or (2) (b) an organic sulfur compound represented by the general formulas (V) and (VII):

$$R^9-S-S-R^{10} \quad (V)$$

$$HS-(CH_2)_d-SH \quad (VI)$$

wherein each of $R^9$ and $R^{10}$ has up to 18 carbon atoms and represents an aliphatic hydrocarbon group, which may be straight chain, branched chain or cyclic, or an aromatic hydrocarbon group, where $R^9$ and $R^{10}$ may be the same or different; and d is an integer of 2 to 8, the amounts of the organic sulfur compounds represented by the formulas of (VI) and (VII) being about 0.05 to about 1.0 mole and about 0.001 to about 0.2 mole per mole of titanium trichloride in the titanium trichloride composition, respectively.

2. The method of claim 1, wherein the titanium trichloride composition is a titanium trichloride composition represented by the general formula (A):

$$TiCl_3(AlCl_3)_a \quad (A)$$

prepared by reducing titanium tetrachloride with metallic aluminum to obtain a reduction product and ball-milling the reduction product.

3. The method of claim 1, wherein the titanium trichloride composition is a titanium trichloride composition prepared by reducing titanium tetrachloride with an organo-aluminum compound represented by the general formula (B):

$$R'_p AlZ_{3-p} \tag{B}$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3.

4. The method of claim 3, wherein the titanium trichloride composition is a titanium trichloride composition prepared by reducing titanium tetrachloride with said organo-aluminum compound; separating the resulting solid product; washing the separated solid and heat-treating the washed product at a temperature of about 80° to 180° C.

5. The method of claim 1, wherein the titanium trichloride composition is a titanium trichloride composition prepared by reducing titanium tetrachloride with an organo-aluminum compound represented by the general formula (B):

$$R'_p AlZ_{3-p} \tag{B}$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3; and treating the reduction product with an aluminum compound represented by the general formula (C):

$$R''_q AlX_{3-q} \tag{C}$$

wherein R'' has up to 18 carbon atoms and represents an aliphatic hydrocarbon group, which may be straight chain, branched chain or cyclic, or an aromatic hydrocarbon group, X represents a halogen atom, and q is a number defined by $1 \leq q < 1.5$ at room temperature to 200° C.

6. The method of claim 5, wherein said method additionally includes treating the resulting product with an ether compound represented by the formula (II) at about 0° to 100° C., the amount of the ether compound being about 0.05 to about 3.0 moles per mole of titanium trichloride present in the reduction product.

7. The method of claim 1, wherein the titanium trichloride composition is a titanium trichloride composition prepared by reducing titanium tetrachloride with an organo-aluminum compound represented by the general formula (B):

$$R'_p AlZ_{3-p} \tag{B}$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3; treating the reduction product with the ether compound represented by the formula (II) at about 0° to 100° C., the amount of the ether compound being about 0.05 to about 3.0 moles per mole of titanium trichloride present in the reduction product; and treating the resulting ether-treated solid with an aluminum compound represented by the general formula (C):

$$R''_q AlX_{3-q} \tag{C}$$

wherein R'' has up to 18 carbon atoms and represents an aliphatic hydrocarbon group, which may be straight chain, branched chain or cyclic, or an aromatic hydrocarbon group, X represents a halogen atom, and q is a nunber defined by $1 \leq q < 1.5$, at room temperature to 200° C.

8. The method of claim 7, wherein said method additionally includes treating the resulting product with the ether compound represented by the formula (II) at about 0° to about 100° C., the amount of the ether being about 0.05 to about 3.0 moles per mole of titanium trichloride in the resulting product.

9. The method of claim 1, wherein the titanium trichloride composition is a titanium trichloride composition prepared by reducing titanium tetrachloride with an organo-aluminum compound represented by the general formula (B):

$$R'_p AlZ_{3-p} \tag{B}$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3; treating the reduction product with the ether compound represented by the formula (II) at about 0° to about 100° C., the amount of the ether compound being about 0.05 to about 3.0 moles per mole of titanium trichloride present in the reduction product; and treating the ether-treated solid with an aluminum compound represented by the general formula (C):

$$R''_q AlX_{3-q} \tag{C}$$

wherein R'' has up to 18 carbon atoms and represents an aliphatic hydrocarbon group, which may be straight chain, branched chain or cyclic, or an aromatic hydrocarbon group, X represents a halogen atom, and q is a number defined by $1 \leq q < 1.5$; in the presence of an organic halogen compound represented by the general formula (D):

$$R'''X \tag{D}$$

wherein R''' has up to 18 carbon atoms and represents an aliphatic hydrocarbon group, which may be straight chain, branched chain or cyclic, or an aromatic hydrocarbon group, and X represents a halogen atom, at room temperature to 200° C.

10. The method of claim 9, wherein said method additionally includes treating the resulting product with the ether compound represented by the formula (II) at about 0° to about 100° C., the amount of the ether being about 0.05 to about 3.0 moles per mole titanium trichloride in the resulting product.

11. The method of claim 1, wherein the titanium trichloride composition is a titanium trichloride composition prepared by reducing titanium tetrachloride with an organo-aluminum compound represented by the general formula (B):

$$R'_p AlZ_{3-p} \qquad (B)$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3; treating the reduction product with the ether compound represented by the formula (II) at about 0° to about 100° C., the amount of the ether being about 0.05 to about 3.0 moles per mole of the titanium trichloride present in the reduction product; and treating the ether-treated solid with an aluminum halide represented by the general formula (E):

$$AlX_3 \qquad (E)$$

wherein X represents a halogen atom, dissolved in an aromatic hydrocarbon in the presence of a hydrogen halide represented by the general formula (F):

$$HX \qquad (F)$$

wherein X represents a halogen atom, at about −100° to about 200° C., the concentration of the aluminum halide being about 1 to 80% by weight.

12. The method of claim 11, wherein said method additionally includes treating the resulting product with an ether compound represented by the formula (II) at about 0° to about 100° C., the amount of the ether being about 0.05 to about 3.0 moles per mole of titanium trichloride in the resulting product.

13. The method of claim 1, wherein the titanium trichloride composition is a titanium trichloride composition prepared by reducing titanium tetrachloride with an organo-aluminum compound represented by the general formula (B):

$$R'_p AlZ_{3-p} \qquad (B)$$

wherein R' has up to 18 carbon atoms and represents an aliphatic hydrocarbon group, which may be straight chain, branched chain or cyclic, or an aromatic hydrocarbon group, Z represents a halogen atom or a hydrogen atom, and p is a number of from 1 to 3; treating the reduction product with an ether compound represented by the formula (II) at about 0° to about 100° C., the amount of the ether being about 0.05 to about 3.0 moles per mole of titanium trichloride present in the reduction product; and then treating the ether-treated solid with titanium tetrachloride at a room temperature to 100° C.

14. The method of claim 1, wherein said hydrocarbon compound is selected from the group consisting of cumene, p-cymene, sec-butylbenzene, p-sec-butyltoluene, 2-isopropylnaphthalene, 6-isopropyltetralin, 1-ethylindane, 9-methylfluorene, triphenylmethane, 1,1,2-triphenylethane and 2,3-diphenylbutane.

15. The method of claim 14, wherein the hydrocarbon compound is cumene or triphenylmethane.

16. The method of claim 1, wherein said organic sulfur compound is selected from the group consisting of dimethyl disulfide, diethyl disulfide, di-n-butyl sulfide, di-n-amyl sulfide, ethyl tert-butyl disulfide, di-sec-butyl disulfide, di-tert-butyl disulfide, diisobutyl disulfide, di-n-hexyl disulfide, dilauryl disulfide, diphenyl disulfide, di-l-naphthyl disulfide, di-p-tolyl disulfide, dibenzyl disulfide, 1,2-ethane dithiol, trimethylene mercaptan, tetramethylene mercaptan and hexamethylene mercaptan.

17. The method of claim 16, wherein the organic sulfur compound is 1,2-ethane dithiol or di-n-butyl disulfide.

18. The method of claim 1, wherein the ether compound is di-n-butyl ether or diisoamyl ether.

19. The method of claim 6, wherein the both ether compounds represented by the formulas (II) and (III) are di-n-butyl ether or diisoamyl ether.

20. The method of claim 7, wherein the both ether compounds represented by the formulas (II) and (III) are di-n-butyl ether or diisoamyl ether.

21. The method of claim 8, wherein the both ether compounds represented by the formulas (II) and (III) are di-n-butyl ether or diisoamyl ether.

22. The method of claim 9, wherein the both ether compounds represented by the formulas (II) and (III) are di-n-butyl ether or diisoamyl ether.

23. The method of claim 10, wherein the both ether compounds represented by the formulas (II) and (III) are di-n-butyl ether or diisoamyl ether.

24. The method of claim 11, wherein the both ether compounds represented by the formulas (II) and (III) are di-n-butyl ether or diisoamyl ether.

25. The method of claim 12, wherein the both ether compounds represented by the formulas (II) and (III) are di-n-butyl ether or diisoamyl ether.

26. The method of claim 13, wherein the both ether compounds represented by the formulas (II) and (III) are di-n-butyl ether or diisoamyl ether.

27. The method of claim 5, wherein the aluminum compound represented by the general formula (C) is an alkyl-aluminum dichloride.

28. The method of claim 7, wherein the aluminum compound represented by the general formula (C) is an alkyl-aluminum dichloride.

29. The method of claim 9, wherein the aluminum compound represented by the general formula (C) is an alkyl-aluminum dichloride.

30. The method of claim 9, wherein the organic halogen compound represented by the general formula (D) is an organic halogen compound containing an alkyl group or an aralkyl group.

31. The method of claim 11, wherein the aluminum halide represented by the general formula (E) is aluminum chloride.

32. The method of claim 1, wherein the amount of the hydrocarbon compound represented by the general formula (IV) is 0.05 to 5.0 mols per mol of titanium trichloride in the titanium trichloride composition.

33. The method of claim 1, wherein the amount of the organic sulfur compound is 0.01 to 0.5 mol per mol of titanium trichloride in the titanium trichloride composition.

34. The method of claim 1, wherein the amount of the ether compound is 0.03 to 3.0 mols per mol of titanium trichloride in the titanium trichloride composition.

* * * * *